A. E. GARBER.
GAS ENGINE GAS SAVER AND CARBON DECOMPOSER.
APPLICATION FILED MAY 15, 1915.
1,178,913. Patented Apr. 11, 1916.
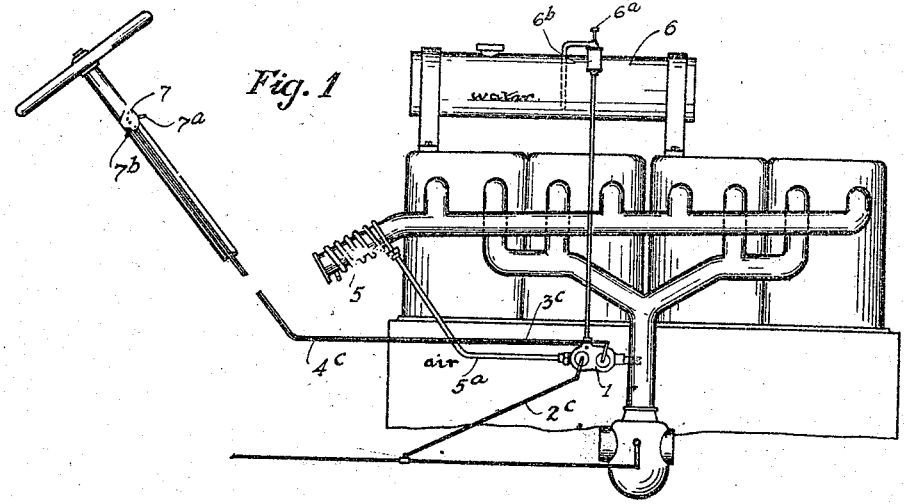
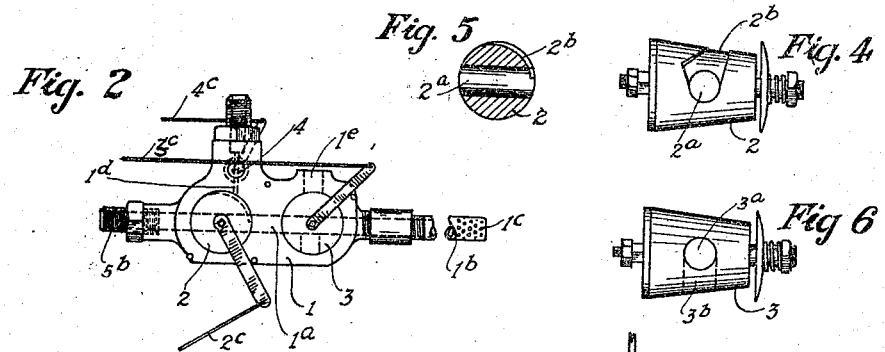
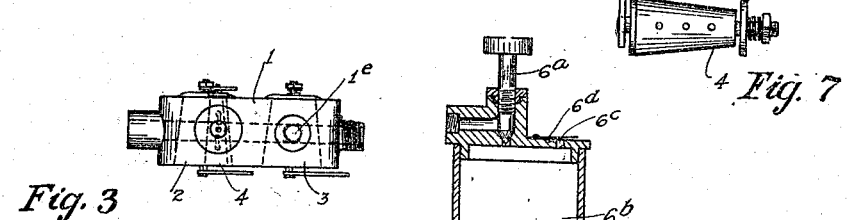
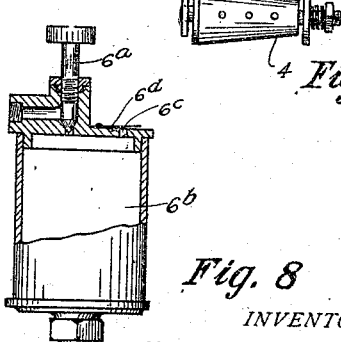
WITNESS
Grove E. Herrmann
INVENTOR.
ARTHUR E. GARBER.
BY
A. B. Bowman
ATTORNEY.

UNITED STATES PATENT OFFICE.

ARTHUR E. GARBER, OF SAN DIEGO, CALIFORNIA.

GAS-ENGINE GAS-SAVER AND CARBON-DECOMPOSER.

1,178,913.     Specification of Letters Patent.     Patented Apr. 11, 1916.

Application filed May 15, 1915. Serial No. 28,397.

*To all whom it may concern:*

Be it known that I, ARTHUR E. GARBER, a citizen of the United States, residing at San Diego, in the county of San Diego and State of California, have invented certain new and useful Improvements in Gas-Engine Gas-Savers and Carbon-Decomposers, of which the following is a specification.

My invention relates to an apparatus to be used in connection with gas engines for reducing the quantity of gas consumed and for decomposing the carbon in the cylinders.

The objects of my invention are; first, to provide a device of this class in which air is introduced into the manifold and to the engine cylinders when the carbureter is shut off when using the compression of the engine for retarding the vehicle in going down hill; second, to provide a small quantity of hot air in the manifold in connection with the gas when the carbureter is open and the engine in action; third, to provide a means of introducing water in small quantities into the manifold above the carbureter for decomposing the carbon therein and adding to the efficiency of the fuel mixture; fourth, to provide means for shutting off the water to the manifold when the carbureter is closed; fifth, to provide combined means for controlling the flow of hot air and water to the manifold; sixth, to provide means readily accessible to the driver of the vehicle for controlling the same and seventh, to provide an apparatus of this class which is simple and economical of construction, durable, easily installed and does not readily get out of order.

With these and other objects in view as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1, is a diagrammatic view of my device complete. Fig. 2, is a detailed side view of the valve mechanism, Fig. 3, is a top or plan view thereof. Fig. 4, is a detailed side view of one of the valves, Fig. 5, is a transverse sectional view, through the middle of Fig. 4, Fig. 6, is a side view of another valve, Fig. 7, is a side view of the water control valve and Fig. 8, is a detailed fragmentary enlarged view of a portion of the control means for the water supply.

Similar characters of reference refer to similar parts throughout the several views.

The valve casing 1, valve 2, valve 3, valve 4, coil 5, tank 6, and operating device 7, constitute the principal parts of my apparatus.

The valve casing 1, is provided with a hole $1^a$, extending lengthwise therethrough. This casing 1 is provided on one end with a hollow plug $1^b$, which is provided with a plurality of perforations $1^c$. This casing 1 is provided with tapered holes spaced apart from each other adapted for the tapered valves 2 and 3 and with a plurality of holes $1^d$ extending from the top side thereof to and connecting with one side of the hole for the valve 2. Through the upper portion of this valve casing 1, is a tapered hole for the tapered valve 4 which is centrally in line with the center of the holes $1^d$ in said casing.

It will be here noted that the valve 2 is provided with a hole $2^a$ extending therethrough and one side of the surface of the tapered piece is provided with a diverging channel $2^b$ so that the water through the hole $1^d$ will be allowed to enter this diverging channel so that the quantity of water to pass through said channel is in accordance with the position of the valve 2 so that when the carbureter is opened to a large extent a larger quantity of water will pass through this diverging channel and thence to the manifold and engine cylinders therefrom. This valve 4, however, is adapted to close off the flow of water through the holes $1^d$ and when so closed no water will flow to the manifold. The valve 3 is provided with a hole $3^a$ therethrough and with another hole $3^b$ at right angles thereto, engaging with the middle of said hole from one side of said valve so as to provide for a passage through the hole $1^a$ to the manifold, or this passage may be closed and a passage from the hole $1^c$ to the manifold when the carbureter is closed thus providing for the use of air in the cylinders for retarding the speed of the vehicle on going down hill instead of the usual method of using the gas for such purposes.

The hot air supply is provided by means of the coil 5 around the exhaust adjacent the engine and it is conducted to the casing 1 through the conducting pipe $5^a$ and connects to the nipple $5^b$ in the casing 1. The water is supplied to the casing 1 by the tank 6 which is preferably mounted on the engine and is provided with a pipe extending down into the tank which is provided with a valve as shown best in Fig. 8 of the drawing. This valve is provided with a needle 6ª adapted to close and open the water to the casing 1 through small reservoirs 6ᵇ. This reservoir 6ᵇ is provided with an air hole 6ᶜ covered with a spring 6ᵈ so that when there is suction from the running engine the water will run from the tank down into the casing 1, the spring 6ᵈ closing the air hole 6ᶜ but when there is no suction, this spring 6ᵈ rises allowing the air to enter the reservoir 6ᵇ thus automatically stopping the water from siphoning when the engine is not running. The valve 2 is operated by means of a rod 2ᶜ which connects with the carbureter control rod. The valves 3 and 4 are controlled by means of cables 3ᶜ and 4ᶜ which extend to the operating device 7 and is provided with the levers 7ª and 7ᵇ which connect with said cables 3ᶜ and 4ᶜ respectively. This operating device 7 is rigidly secured to the steering wheel shaft of the vehicle adjacent the wheel.

Though I have shown and described a particular construction, combination and arrangement of parts, I do not wish to be limited to this particular construction, combination and arrangement but desire to include in the purview of my invention, the construction, combination and arrangement substantially as set forth in the appended claims. It is obvious that with this construction, there is provided an apparatus for providing a regulated quantity of water to the manifold above the carbureter and the same is regulated relatively to the opening and closing of the carbureter; that there is also provided means for furnishing regulated quantities of hot air to the manifold above the carbureter and that said supply is regulated relatively to the opening and closing of the carbureter; that there is also provided means for allowing the outside air to the manifold when the carbureter and water and hot air valves are closed; that the device is simple and economical of construction, durable, easily installed, does not readily get out of order.

Having thus described my invention what I claim as new and desire to secure by Letters Patent, is:

1. In a device of the class described, the combination of a water tank, an air heater, means for conducting water and air to the manifold of a gas engine and means for separately controlling said water and air relatively to the feed of said carbureter.

2. In a device of the class described, the combination of a water tank, means for conducting water from said tank to the manifold of a gas engine, means in said conducting means for regulating and controlling the flow of water therethrough, relatively to the opening and closing of the carbureter and means in connection with said controlling means for supplying air to said manifold when the carbureter and said water supply is closed.

3. In a device of the class described, the combination of an air heater, means for conducting hot air therefrom to the manifold of a gas engine, means in said conducting means for regulating and controlling the flow of hot air to said manifold, relatively to the opening and closing of the carbureter and means in connection with said controlling means for supplying air to said manifold when the carbureter and said water supply is closed.

4. In a device of the class described, the combination of a water supply tank, an air heater, means for conducting water and air to the manifold of a gas engine, combined means for regulating and controlling the flow of water and hot air in said conducting means.

5. In a device of the class described, the combination of a water supply tank, an air heater, means for conducting water and air to the manifold of a gas engine, combined means for regulating and controlling the flow of water and hot air in said conducting means relatively to the opening and closing of the carbureter.

6. In a device of the class described, the combination of a water supply tank, an air heater, means for conducting water and air to the manifold of a gas engine, combined means for regulating and controlling the flow of water and hot air in said conducting means relatively to the opening and closing of the carbureter and means for supplying the outside air to said manifold when said water supply, hot air supply and carbureter is closed.

In testimony whereof, I have hereunto set my hand at San Diego, California, this 10 day of May, 1915.

ARTHUR E. GARBER.